United States Patent
Winkler et al.

[11] 3,892,479
[45] July 1, 1975

[54] SLIDE PROJECTOR FOR USE WITH RING-SHAPED MAGAZINES

[75] Inventors: Alfred Winkler; Wolfgang Geisslinger, both of Munich; Peter Ungnadner, Unterhaching, all of Germany

[73] Assignee: Agfa-Gevaert Aktiengesellschaft, Leverkusen, Germany

[22] Filed: Jan. 23, 1974

[21] Appl. No.: 435,855

[30] Foreign Application Priority Data
Jan. 30, 1973  Germany.................. 7303400[U]

[52] U.S. Cl................................. 353/117; 353/119
[51] Int. Cl.²...................................... G03B 23/06
[58] Field of Search ........... 353/107, 116, 117, 119

[56] References Cited
UNITED STATES PATENTS 3,173,331  3/1965  Danner ............................ 353/57
3,606,545  9/1971  Heinzmann ...................... 353/117
3,790,269  2/1974  Sobotta .......................... 353/117

Primary Examiner—Richard E. Aegerter
Assistant Examiner—A. J. Mirabito
Attorney, Agent, or Firm—Michael S. Striker

[57] ABSTRACT

A slide projector wherein the housing defines an annular chamber surrounding a hollow inverted cup-shaped housing section and serving to receive a ring-shaped magazine which is centered by the cup-shaped section. The cylindrical wall of the section has a vertical slot and the section shields and normally receives one arm of a slide changing mechanism which can be moved radially of a properly inserted magazine along a horizontal path to thereby pass through the slot and expel a photographic transparency from that compartment of the magazine which registers with the slot. Such transparency is caused to enter a slide gate which is located between the projector lens and the projection lamp.

10 Claims, 1 Drawing Figure

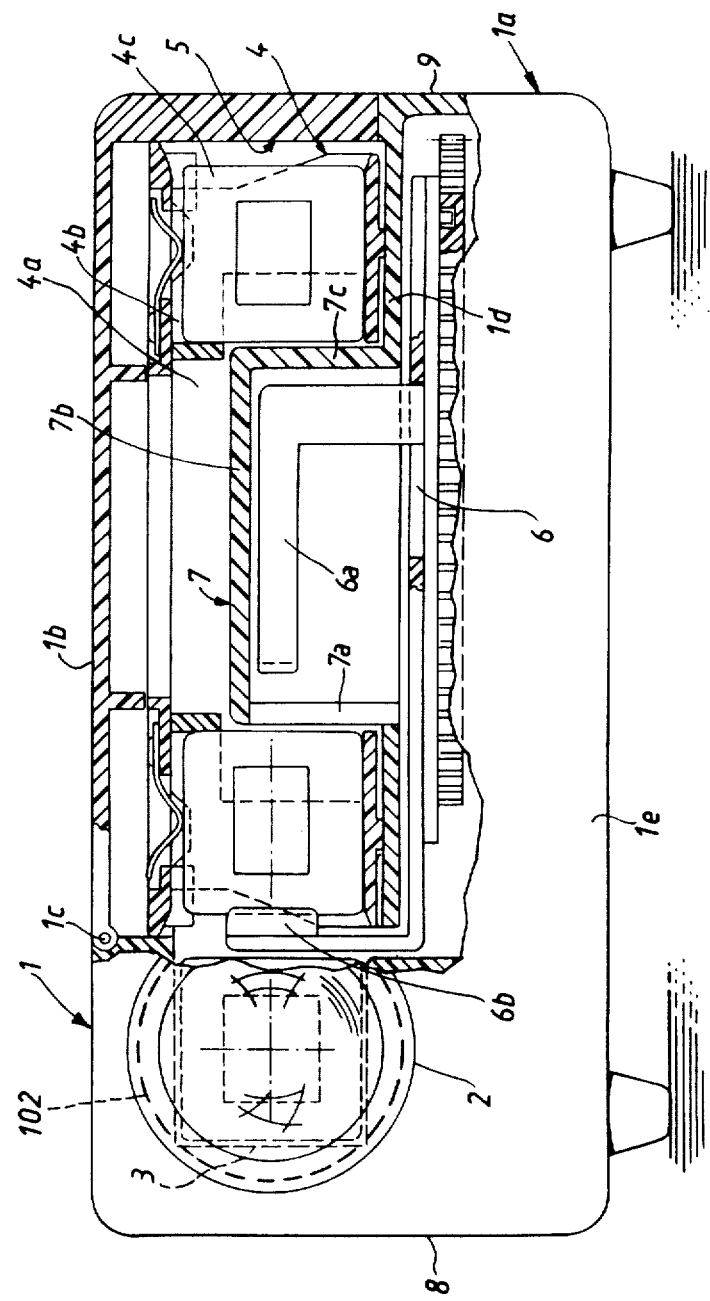

SLIDE PROJECTOR FOR USE WITH RING-SHAPED MAGAZINES

BACKGROUND OF THE INVENTION

The present invention relates to improvements in slide projectors for use with ring-shaped magazines for photographic transparencies. More particularly, the invention relates to improvements in slide projectors wherein the magazines are indexible about vertical axes to place successive or selected photographic transparencies into register with the slide gate and with the slide changing mechanism.

It is already known to provide a slide projector which can be used with ring-shaped magazines for photographic transparencies with a slide changing mechanism one arm of which is normally located in the interior (i.e., in the centrally located aperture) of a properly installed ring-shaped magazine. Such arm of the slide changing mechanism is movable radially of the magazine to thereby expel a selected photographic transparency from the respective compartment of the magazine and to advance the thus expelled transparency into the space between the projector lens and the light source so that the image of the transparency can be viewed on a screen or the like.

A drawback of presently known slide projectors of the just outlined character is that the aforementioned arm of the slide changing mechanism is likely to be damaged or deformed during insertion or removal of a ring-shaped magazine. Moreover, an inexperienced operator is unlikely to immediately place a ring-shaped magazine into an optimum position for insertion into or attachment to the housing of the slide projector.

SUMMARY OF THE INVENTION

An object of the invention is to provide a slide projector which employs ring-shaped magazines for photographic transparencies with novel and improved means for protecting or shielding the slide changing mechanism during insertion or removal of a magazine.

Another object of the invention is to provide a slide projector with novel and improved means for properly guiding and centering ring-shaped magazines during movement toward and upon completion of movement to a position in which the magazine is indexible to place selected or successive photographic transparencies into register with the slide changing mechanism and with the slide gate.

A further object of the invention is to provide a slide projector with a novel and improved housing.

An additional object of the invention is to provide a slide projector wherein the magazine cannot damage that portion of the slide changing mechanism which is used to expel transparencies from their compartments in a magazine into the slide gate.

Still another object of the invention is to provide a slide projector which is compact, simple, rugged and eye-pleasing.

The improved slide projector is intended for use with ring-shaped magazines, also known as circular trays, having radially extending compartments for photographic transparencies. The projector comprises a housing having a hollow section which extends into and is surrounded by a ring-shaped magazine when the latter is mounted in or on the housing, an opening provided in the hollow section in register with a compartment of a magazine which surrounds the hollow section, and a slide changing mechanism installed in the housing and including a portion located in the interior of the hollow section. This portion of the slide changing mechanism is movable outwardly through and beyond the opening to thereby expel a photographic transparency from the compartment which registers with the opening. Such transparency is preferably expelled into and located in a slide gate which is mounted in the housing behind a projector lens and in front of a light source. The aforementioned portion of the slide changing mechanism is preferably reciprocable along a horizontal or nearly horizontal path, i.e., the magazine which surrounds the hollow section of the housing is preferably indexible about a vertical axis which may coincide with the axis of a cylindrical wall of the hollow section. The latter is preferably designed to guide the magazine to its proper position in or on the housing and to thereupon center the magazine.

An important function of the hollow section is to shield the aforementioned portion of the slide changing mechanism during placing of a magazine into or during removal of a magazine from the housing. To this end, the hollow section preferably resembles an inverted cup which, in addition to the cylindrical wall, comprises a top wall at the upper end of the cylindrical wall so that the magazine cannot contact the portion of the slide changing mechanism in the hollow section, at least when the portion of the slide changing mechanism is retracted.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a partly front elevational and partly vertical sectional view of a slide projector which embodies the invention, further showing a ring-shaped magazine which surrounds and is centered by the hollow section of the housing, that portion of the slide changer mechanism which serves to expel photographic transparencies from selected compartments of a properly mounted magazine being shown in fully retracted position.

DESCRIPTION OF THE PREFERRED EMBODIMENTS

The slide projector which is shown in the drawing comprises a substantially rectangular housing 1 having a lower portion 1a and an upper portion or cover 1b which is pivotably connected to the lower portion 1a by a hinge 1c. The lower portion 1a includes a disk-shaped part 1d which is integral with a hollow inverted cup-shaped section 7 surrounded by an annular chamber 5 for a ring-shaped magazine or tray 4 having a central aperture or passage 4a and a plurality of radially extending compartments 4b for photographic transparencies 4c. When the cover 1b is pivoted to its open position, the magazine 4 in the annular chamber 5 is accessible for removal from the housing 1. The hollow section 7 comprises an upright cylindrical wall 7c and a horizontal top wall 7b at the upper end of the cylindrical wall 7c. The latter is provided with a vertical opening or slot 7a which is in register with a compartment 4b of a properly inserted magazine 4.

A slide gate 3 is in register with the opening or slot 7a and is outwardly adjacent to that compartment 4b which is adjacent to the slot 7a. The gate 3 is mounted in the housing 1 behind a projector lens 2 and in front of a light source 102 which can produce a beam of light passing through a transparency 4c in the gate 3 so that the image of such transparency can be viewed on a screen, not shown. The lens 2 is mounted in the front wall 1e of the housing 1.

The hollow section 7 serves as a protection shield or enclosure for a portion or arm 6a of a slide changing mechanism. The portion 6a is reciprocable radially of the cylindrical wall 7c and can be moved between the illustrated retracted position and an extended position to thereby move toward, through and partially beyond the slot 7a whereby a transparency 4c is expelled from its compartment 4b and is introduced into the slide gate 3. A second portion or arm 6b of the slide changing mechanism is connected with the portion 6a and registers with the slot 7a; its purpose is to return a transparency 4c from the gate 3 into the respective compartment 4b when the portions 6a, 6b move together in a direction to the right, as viewed in the drawing, i.e., back to the illustrated positions. The slide changing mechanism further comprises a connector 6 which is rigid with the portions 6a and 6b. The arrangement is preferably such that the portions 6a, 6b must be moved to the illustrated positions before the cover 1b can be pivoted to its open position. This insures that the portion 6a cannot extend beyond the slot 7a when the magazine 4 is accessible for removal from the chamber 5.

The axis of the cylindrical wall 7c coincides with the axis of a properly inserted magazine 4 and this cylindrical wall also serves as a centering means to hold the magazine against excessive radial movements in the chamber 5. The means for indexing the magazine 5 so as to place successive or selected compartments 4b into register with the portions 6a, 6b and slot 7a is of known design and is not specifically shown in the drawing. Such indexing means may comprise a pinion which meshes with a ring gear on the magazine 4 and is rotatable to thereby change the angular position of the magazine through an angle which is a whole multiple (including one) of the angle between the central planes of two neighboring compartments 4b.

The illustrated magazine 4 is of the type disclosed in the commonly owned copending application Ser. No. 434,293 filed Jan. 17, 1974 by Winkler et al. and entitled "Circular Magazine for Photographic Transparencies." Its details, save for the fact that it has a central passage 4a and radially extending compartments 4b which are open at their inner and outer ends, form no part of the present invention.

It will be noted that the hollow section 7 is nearer to the right-hand side wall 9 than to the left-hand side wall 8 of the housing 1, and that the projector lens 2, light source 102 and slide gate 3 are adjacent to the left-hand side wall 8.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended:

1. In a slide projector for use with ring-shaped magazines having radially extending compartments for photographic transparencies, a combination comprising a housing having a hollow section which extends into and is surrounded by a ring-shaped magazine when the latter is mounted in said housing, said hollow section of said housing comprising a substantially cylindrical upright wall and a top wall at the upper end of said cylindrical wall, and said hollow section having an opening provided in said cylindrical wall in register with a compartment of a magazine surrounding said section; and a slide changing mechanism including a portion located in the interior of said hollow section and being movable outwardly through and beyond said opening to engage and expel a photographic transparency from that compartment which registers with said opening, said outwardly movable portion of said slide changing mechanism being located in its entirety below the level of said top wall of said hollow section, whereby if the magazine is removed and then carelessly or inaccurately reinserted into the slide projector housing said top wall will prevent said outwardly movable portion of said slide changing mechanism from being hit and damaged by the magazine.

2. A combination as defined in claim 1, wherein said top wall is a flat unbroken top wall completely blocking access from above into the interior of said hollow section.

3. A combination as defined in claim 1, wherein said portion of said slide changing mechanism is reciprocable along a substantially horizontal path.

4. A combination as defined in claim 3, wherein said housing defines an annular chamber surrounding said section and arranged to receive at least a portion of a ring-shaped magazine so that the axis of such magazine coincides with the axis of said cylindrical wall.

5. A combination as defined in claim 4, wherein said cylindrical wall centers a ring-shaped magazine in said annular chamber.

6. A combination as defined in claim 3, further comprising a slide gate mounted in said housing outwardly adjacent to said opening to receive a photographic transparency which is expelled by said portion of said slide changing mechanism through said opening.

7. A combination as defined in claim 3, wherein said housing further comprises a cover normally overlying said section and a ring-shaped magazine surrounding said section.

8. A combination as defined in claim 3, wherein said slide changing mechanism further comprises a second portion movable with said first mentioned portion and located without said hollow section and in register with said opening so as to return a transparency into a compartment in register with said opening in response to movement of said first mentioned portion into the interior of said section.

9. A combination as defined in claim 3, wherein said opening is a substantially vertical slot.

10. A combination as defined in claim 3, wherein said housing further comprises two substantially parallel side walls and said hollow section is nearer to one than to the other of said side walls, and further comprising a projector lens mounted in said housing adjacent to said other side wall, a light source mounted in said housing behind said lens, and a slide gate mounted in said housing between said lens and said light source and in register with said opening and said portion of said slide changing mechanism.

* * * * *